Patented Apr. 18, 1933

1,903,880

UNITED STATES PATENT OFFICE

LUDWIG SANDER, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

ESTERS OF 2.3-AMINO-NAPHTHOIC ACID AND A PROCESS OF PREPARING THEM

No Drawing. Application filed July 1, 1929, Serial No. 375,334, and in Germany July 14, 1928.

The present invention relates to esters of 2.3-amino naphthoic acid and to a process of preparing the same; more particularly it relates to a process of preparing compounds of the following general formula:

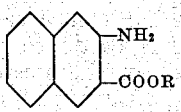

wherein R stands for an acyclic or isocyclic residue.

Hitherto esters of the 2.3-amino-naphthoic acid have only been obtained according to the usual method of esterification by means of alcohol and mineral acids which esterification, however, is in a very surprising manner much more difficult to carry out and less complete than, for instance, the esterification of the analogous anthranilic acid and its derivatives.

Now I have found that the esters of 2.3-amino-naphthoic acid, which are of great value for the production of dyestuffs, are very easily obtained by first converting the 2.3-amino-naphthoic acid by means of chlorocarbonic acid ester or phosgene (for instance according to the process described in French Patent No. 603,970) into 2.3-naphthisatoic anhydride and then causing to act upon the latter an alcohol or a phenol while adding an acid-binding agent, such as potassium carbonate, sodium acetate, pyridine or the like. The $CO_2$-group of the naphthisatoic anhydride attached to the NH-group is thereby split off as carbonic acid.

The following equation illustrates the course of the reaction:

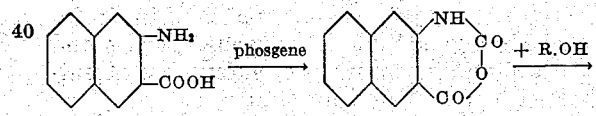

wherein R stands for an acyclic or isocyclic residue.

I have found, furthermore, that the acid binding agents do not act in stoichiometric quantities, but in more catalytic manner so that it is sufficient in many cases to effect the reaction by using for 1 mol of 2.3-naphthisatoic anhydride only a fraction of an equivalent of the acid-binding agent.

The 2.3-amino-naphthoic esters are yellow compounds, soluble in organic solvents and in dilute mineral acids, insoluble in aqueous alkalies. They are diazotizable and, therefore, valuable components for azo dyestuffs.

The following examples serve to illustrate my invention but are not intended to limit it thereto, the parts being by weight:

(1) 500 parts of 2.3-naphthisatoic anhydride are heated to boiling in a reflux apparatus with about 500 parts of finely pulverized potassium carbonate and 5000 parts of methyl alcohol until the naphthisatoic anhydride has entirely dissolved and the evolution of carbonic acid ceases.

The methyl alcohol is then expelled, the residue is stirred with water, filtered by suction, washed, and if desired, recrystallized from alcohol or benzene or purified in known manner by way of the hydrochloride. The yield amounts to 74 per cent of the theoretical.

The 2.3-amino-naphthoic-acid methyl-ester thus obtained which has the formula:

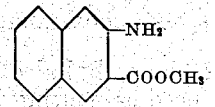

crystallizes from alcohol in brilliant greenish-yellow needles melting at 104° C. to 105° C.

(2) By substituting in Example 1 ethyl alcohol for methyl alcohol, there is obtained the ethyl ester of 2.3-amino-naphthoic acid melting at 117° C. to 118° C.

In an analogous manner there may also

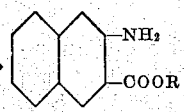

be obtained other esters from the corresponding alcohols, such as, for instance, isopropylester (melting at 85° C.) butylester (in the form of yellow needles melting at 100° C. to 101° C.), isobutylester (melting at 99° C. to 100° C.) and benzylester (melting at 105° C. to 106° C.).

(3) By replacing in Examples 1 and 2 potassium carbonate by the equal quantity of anhydrous sodium acetate, sodium carbonate or potassium bicarbonate, the esters of the 2.3-amino-naphthoic acid are obtained in the same easy manner. There may also be used mixtures of acid binding agents. The products are worked up in the manner described in Example 1.

(4) 500 parts of 2:3-naphthisatoic anhydride are heated to boiling in a reflux apparatus together with 50 parts of finely pulverized potassium carbonate and 5000 parts of methyl alcohol until the 2.3-naphthisatoic anhydride has entirely dissolved and the evolution of carbonic acid ceases.

The working up is the same as described in Example 1. The yield amounts to 71 per cent of the theoretical.

(5) 500 parts of 2.3-naphthisatoic anhydride are heated to 80° C., while vigorously stirring, with 3000 parts of anhydrous glycol and 300 parts of finely pulverized potassium carbonate until the naphthisatoic anhydride has entirely dissolved and the evolution of carbonic acid ceases. The whole is then diluted with water, whereby the potassium carbonate dissolves and the ester is precipitated as a quickly solidifying oil. After it has become entirely solid the ester is filtered with suction, dissolved in dilute hydrochloric acid and again precipitated with dilute caustic soda solution or other bases. The yield amounts to 65 per cent of the theoretical. The 2.3-amino-naphthoic-glycol-mono-ester which has the formula:

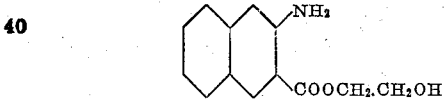

recrystallizes from methyl alcohol in clusters of fine yellow needles melting at 102° C. to 103° C.

From the mother liquor of the crude ester the excess of glycol can be recovered in the usual manner.

(6) By replacing in Example 5 the potassium carbonate by the equal quantity of pyridine the ester is obtained in the same smooth reaction. The ester is isolated as indicated in Example 5.

(7) 500 parts of 2.3-naphthisatoic anhydride, 3000 parts of phenol and 300 parts of potassium carbonate are heated, while vigorously stirring, to 40° C. to 70° C. until the evolution of carbonic acid ceases. The reaction product is stirred with water whereby the ester first separates as an oil which, however, soon solidifies. It is filtered by suction, washed dried and, if desired, recrystallized from benzene. The 2.3-amino-naphthoic phenyl ester which has the formula:

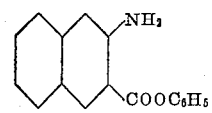

crystallizes from benzene in yellow laminæ melting at 135° C. From the aqueous mother liquors the excess of phenol can be recovered in the usual manner.

I claim:

1. Process which comprises causing 2.3-naphthisatoic anhydride to react with a compound of the following general formula:

wherein R stands for an aliphatic or a phenyl-or benzyl-residue in the presence of an acid binding agent while heating at moderate temperature.

2. Process which comprises causing 2.3-naphthisatoic anhydride to react with an aliphatic alcohol in the presence of alkali carbonate while heating at moderate temperature.

3. Process which comprises causing 2.3-naphthisatoic anhydride to react with methyl alcohol in the presence of potassium carbonate while heating at a temperature up to about the boiling point of methyl alcohol.

4. As new products compounds of the following general formula:

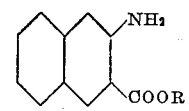

wherein R stands for a substituent of the group consisting of isopropyl, butyl, isobutyl, $CH_2.CH_2.OH$, benzyl and phenyl being yellow compounds, soluble in organic solvents and in dilute mineral acids, insoluble in aqueous alkalies and forming diazonium compounds when treated with nitrite and an acid.

5. As a new product, the compound of the following formula:

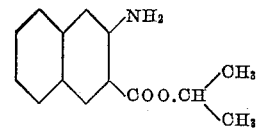

being a yellow compound, melting at 85° C, soluble in organic solvents and in dilute mineral acids, insoluble in aqueous alkalies and forming a diazonium compound when treated with nitrite and an acid.

6. As a new product, the compound of the following formula:

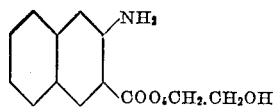

being a yellow compound, melting at 102° C.

to 103° C., soluble in organic solvents and in dilute mineral acids, insoluble in aqueous alkalies and forming a diazonium compound when treated with nitrite and an acid.

7. As a new product, the compound of the following formula:

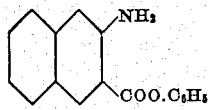

being a yellow compound, melting at 135° C., soluble in organic solvents and in dilute mineral acids, insoluble in aqueous alkalies and forming a diazonium compound when treated with nitrite and an acid.

In testimony whereof, I affix my signature.

LUDWIG SANDER.